Figure 1:
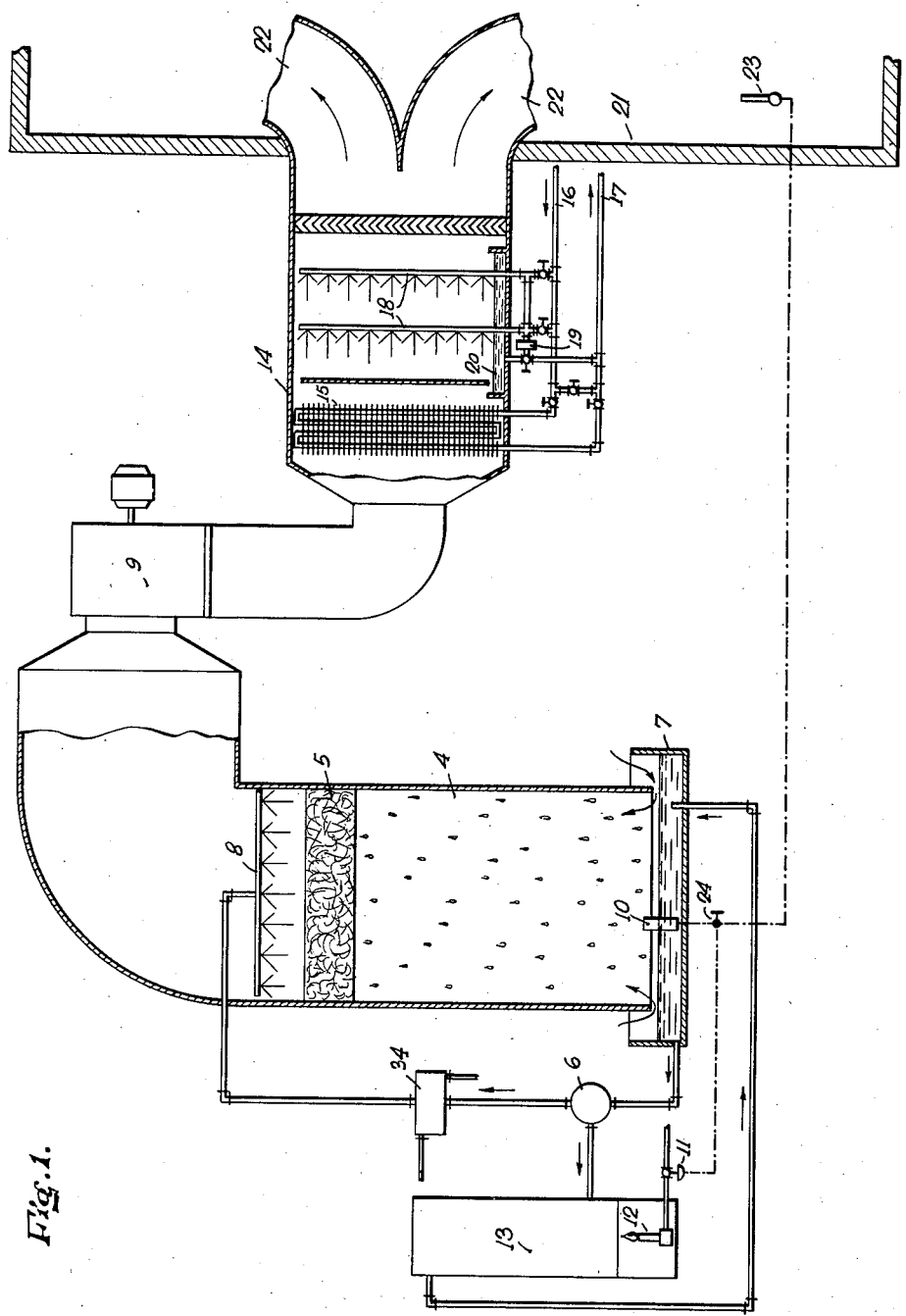

Feb. 14, 1939.    W. L. FLEISHER    2,147,248
ADSORPTION SYSTEM OF AIR CONDITIONING
Filed Dec. 26, 1934    3 Sheets-Sheet 2
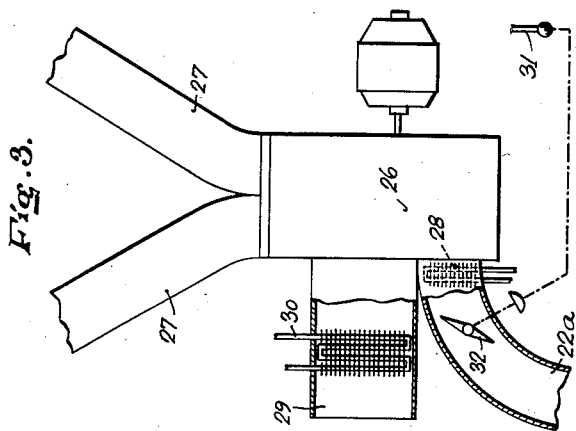
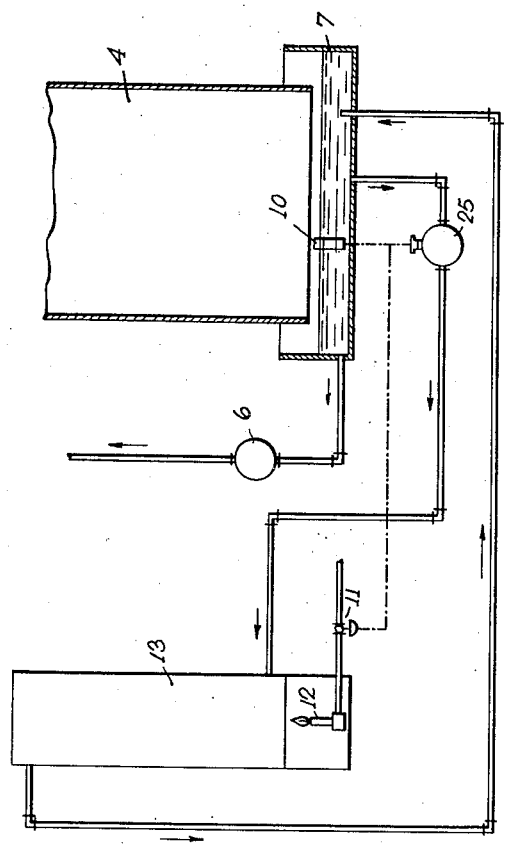
INVENTOR.
Walter L. Fleisher
BY
ATTORNEY.

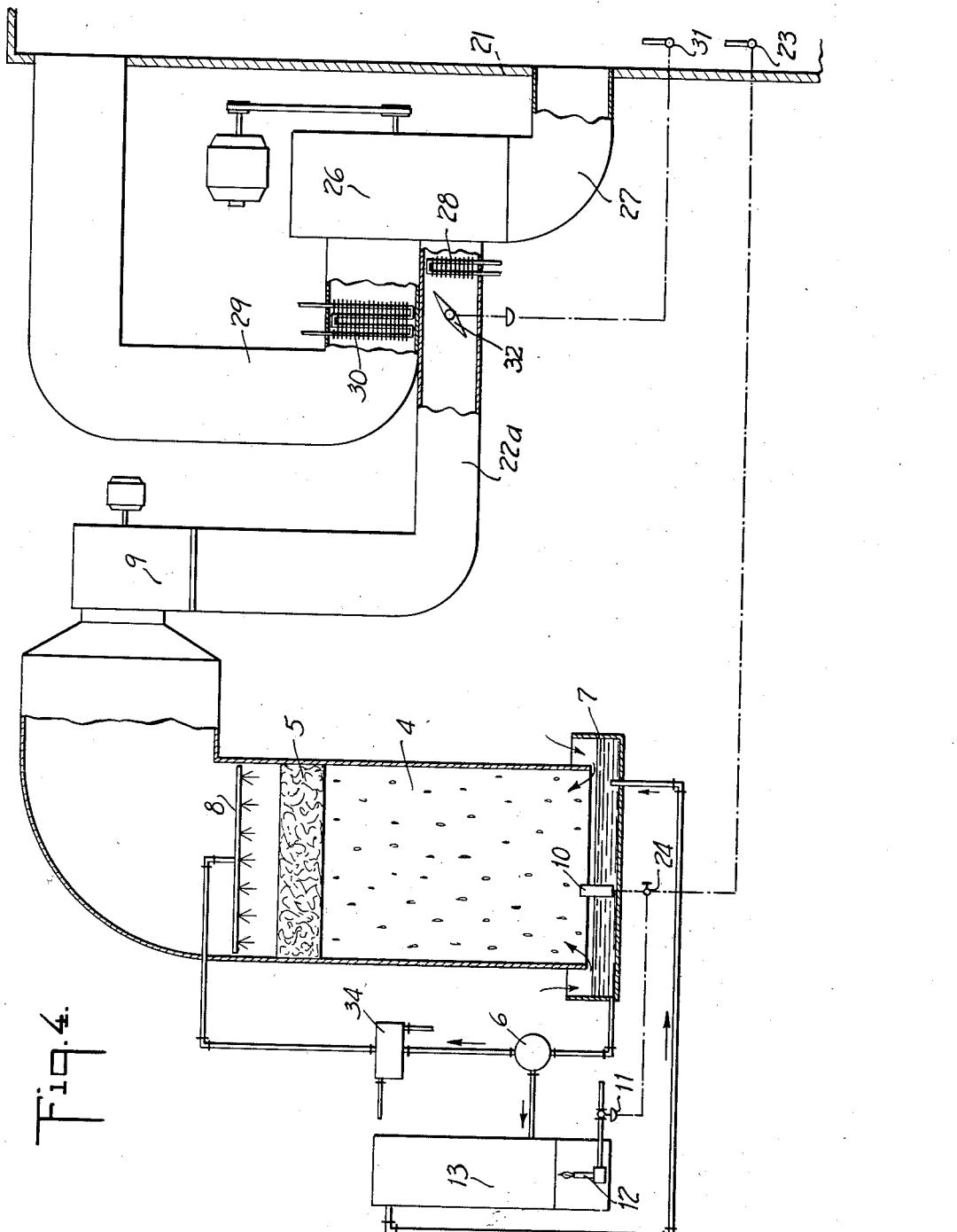

Patented Feb. 14, 1939

2,147,248

UNITED STATES PATENT OFFICE 2,147,248

ADSORPTION SYSTEM OF AIR CONDITIONING

Walter L. Fleisher, New York, N. Y.

Application December 26, 1934, Serial No. 759,178

3 Claims. (Cl. 62—176)

This invention relates to air conditioning systems and more particularly to methods of conditioning air in which a liquid adsorbing agent is utilized.

The general object of the invention is to provide a system of air conditioning in which the absolute humidity of a volume of air is reduced to a desired degree without reducing the dewpoint of the air below that of the area to be conditioned and delivering the air into the area at a temperature lower than that of the area without the necessity for using mechanical refrigeration in the treatment of any of the air used in the system.

Another object of the invention is to condition a first volume of air so that its absolute humidity will be decreased without decreasing its dry bulb temperature and conditioning a second volume of air so that its dry bulb temperature is reduced, and then mixing and delivering the combined volumes of air into the area to be conditioned.

A further object of the invention is to provide for conditioning a volume of air by reducing its absolute humidity content in a first step and then reducing its dry bulb temperature in a second step whereby the final condition of the air is proper for maintaining the area to be conditioned at a predetermined dry bulb temperature and relative humidity.

Another object of the invention is to provide a system of air conditioning in which the absolute humidity of a volume of air is reduced, but the air retained at a temperature sufficiently high so that it may be conveyed to a point remote from the point of conditioning without causing condensation to occur on an uninsulated duct or the like through which the air is circulated. The air at one or more points remote from the point of conditioning is reduced in dry bulb temperature to a desired degree and then distributed through one or more suitable outlets.

A feature of the invention resides in the use of a liquid adsorber for reducing the absolute humidity of a volume of air, then routing said air at a relatively low dewpoint and at a relatively high dry bulb temperature to one or more distributing units located remote from the point of adsorption, the adsorbed air being cooled at each unit to reduce its dry bulb temperature, then mixed with air from the area served by the unit, the mixture then being discharged from the unit at a dry bulb temperature higher than that of the dewpoint of the air in the area served by the unit.

Other objects and features making for simplicity and flexibility in operation of an air conditioning system, and providing a system which is more economical in first cost, and in economy of operation than comparable existing systems and providing other advantages from the standpoints of installation and control will be more apparent from the following description of the invention to be read in connection with the accompanying illustrative drawings in which:

Fig. 1 is a diagrammatic view of one form of system adapted to carry out applicant's invention, Fig. 2 shows an arrangement for regenerating the liquid adsorber whereby its effectiveness in a continuous cycle of operations will at all times be assured, Fig. 3 is a diagrammatic view of a unit arrangement in which the adsorbed air may be utilized for effective conditioning of an enclosure under summer condition, and Fig. 4 is a diagrammatic view showing the combination of adsorber apparatus and distributing unit.

Considering the drawings, similar designations referring to similar parts, numeral 4 designates a conditioner casing equipped with an adsorber unit 5. This unit is in the form of a cartridge or casing suitably filled or packed with glass wool, rock wool, or other material capable of presenting, in the aggregate, a large surface to a volume of air passing in contact therewith. Instead of an adsorber unit, a suitable series of baffles or similar means may be provided, the primary object being to provide a large exposed surface over which a liquid adsorber may effectively be spread. Pump 6 is arranged to draw fluid from sump 7 and discharge it from header 8 equipped with suitable nozzles over the material in the adsorber unit. Fan 9 will draw air into casing 4 as indicated by the arrows and this air will flow through the unit in a direction counter to that of the liquid adsorber and intimately contact with the fluid adsorber in its passage through the packed unit 5. As a result, the air will be dehydrated and the precipitated moisture fall with the liquid adsorber into the sump. The precipitated moisture will cause the adsorber to be diluted. Hydrometer 10 is located in sump 7 and reflects changes in specific gravity in the sump. The hydrometer is suitably arranged to control fuel valve 11 serving burner 12 of regenerator apparatus 13. The pump is arranged to by-pass a desired percentage of the liquid drawn from sump 7 to the regenerator 13. As the specific gravity of the mixture or solution of adsorbing material and precipitated moisture is reduced, the burner 12 will be activated and cause the moisture to be drawn off from the solution passing through the regenerator. The boiling point of the adsorber is higher than that of water, with the result that the regenerated adsorber substantially free from moisture will be returned to the sump. Thus, the system is automatic and assures a supply of adsorbing material at all times regardless of the rate of adsorption carried on in the unit. A suitable relief is provided in connection with the adsorber for dissipating the removed moisture and a cooling coil served by city main water, well water, or the like, will preferably be utilized at the outlet end of regenerator 13 for reducing the temperature of the adsorber before its return to the sump and/or may also be positioned as at 34. Instead of using hydrometer 10, a wet bulb thermostat or hygrostat 23 may be employed. Such an instrument will be located in the enclosure served by the system and reflect the wet bulb temperature or relative humidity in the enclosure. When the wet bulb temperature or relative humidity rises above a desired limit, the instrument will cause valve 11 to function in the same manner as hereinbefore described in connection with hydrometer 10. Valve 24 may be used to shift control from the hydrometer to the instrument 23.

When the air leaves the unit 4, its dewpoint will be very substantially reduced, but its dry bulb temperature will be higher than prior to the adsorption step. This is due to the liberation of the latent heat of evaporation by reason of the adsorption step, which is liberated in the form of sensible heat. The air will then be routed through cooling unit 14. While this unit is shown at the outlet end of fan 9, it may be positioned at the inlet end of a fan, between the adsorber unit and the fan. As shown in Fig. 1, the air, after leaving fan 9, will first pass through cooling coil 15. The cooling coil is supplied with water from any desirable source and reduces both the dry and wet bulb temperatures of the air. The water serving the coils may be well water at a desired low temperature, and if so, will reduce the wet bulb temperature of the air to a predetermined level, say in the neighborhood of 63 degrees. If well water is not available, or city main water is not at a suitable temperature for adequate lowering of the temperature of the air, a refrigerated source may be employed. In this case, inlet and outlet conduits 16 and 17 will be suitably connected to a source of conditioned water, brine, or other refrigerating medium. Sprays 18 may be utilized to saturate the air at its wet bulb subsequent to its passage through coils 15. Usually, this saturation will be accomplished by adiabatic evaporation. Pump 19 will recirculate the water from sump 20 through sprays 18 in a continuous cycle of operations.

If desired, the coils 15 may be made inoperative and conduits 16 and 17 connected directly to the sprays. By manipulating the valves leading to the sprays and to the coils, it will be noted that the coils may be used alone or the sprays used alone, or both the coils and the sprays used. Or, if desired, the coils may be used with the sprays inoperative; or the coils used with the sprays serving to saturate by adiabatic evaporation.

Applicant's preferred method will be to cool the air by circulating water at a desired temperature through the coils. If the air is not sufficiently cool when it emerges from the coils, the sprays may then be utilized to saturate the air at the reduced wet bulb. The air will then be distributed within enclosure 21 through distributing ducts 22.

In Fig. 2 is illustrated a more comprehensive control arrangement for regulating the regeneration of the liquid adsorber. In this case, pump 6 does not by-pass to regenerator 13 any of the liquid drawn from sump 7, but instead delivers all of it to the sprays serving casing 4. A separate pump 25 is provided for delivering adsorber fluid and precipitated moisture from sump 7 to the regenerator and returning the liquid adsorber to the sump. Hydrometer 10 will cause pump 25 and burner or the like 12 to become operative when the density is decreased responsive to dilution by precipitated moisture to a prescribed degree, and to make the pump and burner or the like inoperative when the density of the liquid in the adsorber rises to reflect a desired restored specific gravity. Instead of utilizing a hydrometer to control the operation of the pump and burner, a wet bulb thermostat or hygrostat operative responsive to humidity conditions in the enclosure may be utilized as described in connection with Fig. 1. Also, instead of utilizing a burner fed by gas, any heating means, electrical, steam or otherwise, may be used to drive off the moisture from the adsorber.

In Fig. 3, applicant discloses an effective method of distributing the conditioned air. The air delivered through ducts 22a is at a low dewpoint. Assuming that cooling coils 15 are effective but that sprays 18 are inoperative, then the air would be cooled to a degree determined by the temperature of the fluid circulated through coils 15; or, if direct expansion of refrigerant is availed of in coils 15, then the air may be cooled by reason of resultant refrigeration to a desired temperature. In either event, the air will not be cooled to a temperature below its dewpoint nor to a temperature below the dewpoint of the air coming in contact with ducts 22a. As a result, no condensation will occur on the outer surfaces of ducts 22a nor need the ducts be insulated. The air will reach distributing unit 26 through duct 22a and if it is at the proper dry bulb temperature will be discharged directly into the conditioned enclosure through discharge ducts. The unit may be of the type disclosed in applicant's Patent No. 1,983,023. If the air delivered through duct 22a is too high in temperature, it may further be cooled by the circulation of a refrigerant from a suitable source through tempering coil 28.

The unit will normally draw in a volume of air from the conditioned area served by the unit through connection 29. The air so intaken may be referred to as recirculated or by-passed air. It serves to augment the conditioned air and to temper the conditioned air. A coil 30 may be provided and refrigerant, cooling water or steam, may be fed through said coil or a plurality of them to cool or heat the recirculated air depending upon the season of the year and the requirements of the conditioned area. A thermostat 31 in the conditioned area will control a damper 32 in duct 22a, responsive to conditions in the area. Upon a rise in temperature in the conditioned area, damper 32 will tend to open wider whereas upon a fall in temperature, the damper will tend to close and reduce the volume of dehydrated air admitted to the unit. Thus, more or less conditioned air from the adsorption apparatus will be fed to unit 26, and since the fan at the unit under normal operating conditions always delivers a constant volume of air, the volume of by-passed air delivered by the unit will vary with the volume of conditioned air handled by the unit. As more conditioned air is drawn through duct 22a less by-passed air will be drawn through connection 29 and vice versa. Unlike other by-pass systems, the air drawn through connection 29 may under summer conditions, be cooled so that its mixture with the conditioned air will produce a temperature lower than that of the conditioned air itself. If desired, a damper may be placed in connection 29 and connected to operate reciprocally with damper 32.

So also, when cooling coils 15 are used to lower the wet bulb of the adsorbed air and sprays 18 also used to saturate the air at the low wet bulb, the air may directly be introduced into the conditioned enclosure, depending on the method of distribution employed, or mixed with recirculated or by-passed air from the enclosure prior to discharge therein. If the air from the casing 14 is too cold for comfort, it may be mixed with recirculated air so that a mixture is formed higher in temperature and lower in relative humidity than the conditioned air. Applicant does not limit himself with respect to precise methods of distribution and/or tempering and/or augmenting the volume of conditioned air; but deems any system to be within the purview hereof wherein air is treated by a liquid adsorber to reduce its absolute humidity and then delivered for immediate use or further handling at a dry bulb temperature higher than that of the dewpoint of the air in the conditioned area.

The adsorber will be lithium chloride, zinc chloride, or other suitable liquid having equivalent qualities for adsorbing relatively large amounts of moisture vapor from air to reduce its absolute humidity content. When sprays are used instead of a glass or rock wool unit for spreading the liquid, nozzles of suitable character will be employed to create a fine mist and the liquid discharged at a pressure sufficient to compensate for the viscosity of the liquid employed. Also, the adsorber should be odorless, non-toxic, non-inflammable and have a high boiling point, so that it can be used with safety in a system of air conditioning for human comfort.

Since certain changes in carrying out the above method of operation and in the constructions set forth, which embody the invention, may be made without departing from its scope, it is intended that all matter contained in the above description or shown in the accompanying drawings shall be interpreted as illustrative and not in a limiting sense.

I claim:

1. A method of conditioning the atmosphere of an enclosure consisting in dehydrating a volume of air to lower the dewpoint thereof, delivering said air at its new dewpoint to a distribution unit, lowering the dry bulb temperature of said air at the distribution unit, then mixing said air with other air at the distribution unit, controlling the proportions of said air and the other air mixed in the unit responsive to atmospheric conditions in the enclosure served by the unit, and delivering to an enclosure the mixed air from the unit in constant volume regardless of changes in the proportions of the mixed air delivered by the unit, and controlling the cooling action at the distribution point whereby the temperature of said cooled air and of the mixture is above the dewpoint of the air in the enclosure.

2. A method of conditioning the atmosphere of an enclosure consisting in conditioning a volume of air at a first point whereby its dewpoint will be lowered but its dry bulb temperature will not be lowered, delivering said air to a distribution point remote from the first point and proximate to an enclosure to be conditioned, maintaining the air during its passage between said points at a dry bulb temperature higher than the dewpoint temperature of the ambient atmosphere surrounding the conduit through which the air is conveyed, whereby condensation will not take place on the conduit through which said air is conveyed, cooling said air at the distribution point whereby its dry bulb temperature will be reduced but its dewpoint remain unaffected, then mixing said air with air from the enclosure to be conditioned at the distribution point, regulating the proportions of said air and air from the enclosure mixed therewith and delivering the mixture to the enclosure at a dry bulb temperature and dewpoint lower than the dry bulb temperature and dewpoint in the enclosure, and controlling the cooling action at the distribution point whereby the temperature of said cooled air and of the mixture is above the dewpoint of the air in the enclosure.

3. A method of conditioning the atmosphere of an enclosure consisting in treating a volume of air at a central station whereby its dewpoint will be lowered but its dry bulb temperature will not be lowered, delivering through a conduit said air to a distribution point separated by a section of duct from the central station, maintaining the air during its passage between the central station and distribution point at a dewpoint lower than that of the atmosphere surrounding the conduit but at a higher dry bulb temperature, whereby condensation will not take place on the conduit, cooling said air by indirect heat exchange at said distribution point prior to discharge from the distribution point whereby its dry bulb temperature will be reduced but its dewpoint remain unaffected, then mixing said air with air from the enclosure to be conditioned and discharging said mixed air from the distribution point for conditioning an enclosure connected to the distribution point, and controlling the heat exchange at said distribution point whereby the reduced dry bulb temperature will remain above the dewpoint of the air in the enclosure.

WALTER L. FLEISHER.